(12) United States Patent
Johnson et al.

(10) Patent No.: US 10,151,621 B2
(45) Date of Patent: Dec. 11, 2018

(54) DISPENSING ASSEMBLY WITH CONTINUOUS LOSS OF WEIGHT FEED CONTROL

(71) Applicant: Nol-Tec Systems, Inc., Lino Lakes, MN (US)

(72) Inventors: Erik W. Johnson, Mendota Height, MN (US); Michael G Thiel, Minneapolis, MN (US)

( * ) Notice: Subject to any disclaimer, the term of this patent is extended or adjusted under 35 U.S.C. 154(b) by 37 days.

(21) Appl. No.: 14/913,290

(22) PCT Filed: Aug. 21, 2014

(86) PCT No.: PCT/US2014/052160
§ 371 (c)(1),
(2) Date: Feb. 19, 2016

(87) PCT Pub. No.: WO2015/027099
PCT Pub. Date: Feb. 26, 2015

(65) Prior Publication Data
US 2016/0202110 A1     Jul. 14, 2016

Related U.S. Application Data

(60) Provisional application No. 61/868,247, filed on Aug. 21, 2013.

(51) Int. Cl.
*G01G 13/295* (2006.01)
*G05B 15/02* (2006.01)
(Continued)

(52) U.S. Cl.
CPC .......... *G01G 13/2952* (2013.01); *G01F 1/76* (2013.01); *G01G 11/086* (2013.01); *G05B 15/02* (2013.01); *G05D 7/0605* (2013.01)

(58) Field of Classification Search
CPC .......... G01F 1/76–1/90; G05D 7/0605; G01G 11/08; G01G 11/086; G01G 13/295; G01G 13/2951; G01G 13/2952
See application file for complete search history.

(56) References Cited

U.S. PATENT DOCUMENTS 2,919,159 A    12/1959   Lacroix
3,190,509 A     6/1965   Kirchhoefer
(Continued)

FOREIGN PATENT DOCUMENTS

FR           1316052 A    12/1963

OTHER PUBLICATIONS

FLSmidth, "Reagent Injection Technology", FLSmidth Inc., Jun. 2008 (2 pages).
(Continued)

*Primary Examiner* — J. Casimer Jacyna
(74) *Attorney, Agent, or Firm* — DMK Intellectual Property Law; Deirdre M. Kvale

(57) ABSTRACT

A dispensing system is disclosed for dispensing material from multiple hoppers to a convey line. As disclosed, material is dispensed from the hoppers via operation of a variable rate feed device. The application discloses a controller device configured to utilize input from a first load cell for a first hopper and a second load cell for a second hopper to determine a mass flow rate to increase or decrease the feed rate so that the flow rate of material dispensed into the convey line matches a set mass flow rate of material. In the embodiments disclosed, the hoppers include hoppers connected in series to the convey line and hoppers connected in parallel to the convey line. The controller device determines the mass flow rate based upon input from one of the first or second load cells during a first time period and both the first (Continued)

and second loads cells during a second time period for different operating phases of the system.

20 Claims, 14 Drawing Sheets

(51) Int. Cl.
  *G01F 1/76* (2006.01)
  *G05D 7/06* (2006.01)
  *G01G 11/08* (2006.01)

(56) References Cited

U.S. PATENT DOCUMENTS

| | | | | |
|---|---|---|---|---|
| 3,884,453 | A * | 5/1975 | Pearce | C21C 5/34 |
| | | | | 266/221 |
| 3,938,848 | A | 2/1976 | Krambrock | |
| 4,060,183 | A | 11/1977 | Puurunen | |
| 4,136,857 | A * | 1/1979 | Kolb | C21O 5/30 |
| | | | | 266/245 |
| 4,205,931 | A | 6/1980 | Singer | |
| 4,341,107 | A * | 7/1982 | Blair | C23C 16/52 |
| | | | | 137/101.19 |
| 4,427,135 | A | 1/1984 | MacKay | |
| 4,488,837 | A * | 12/1984 | Mizokawa | G01G 11/003 |
| | | | | 177/16 |
| 4,490,077 | A | 12/1984 | Shimada | |
| 4,528,848 | A | 7/1985 | Hafner | |
| 4,850,703 | A | 7/1989 | Hanaoka | |
| 4,883,390 | A | 11/1989 | Reintjes | |
| 5,365,950 | A | 11/1994 | Yoshimoto | |
| 5,576,499 | A * | 11/1996 | Davies | G01F 1/30 |
| | | | | 73/433 |
| 5,670,751 | A * | 9/1997 | Hafner | G01G 11/08 |
| | | | | 177/1 |
| 5,738,249 | A | 4/1998 | Kikuchi et al. | |
| 6,500,238 | B1 | 12/2002 | Brandes | |
| 2006/0056924 | A1 | 3/2006 | Jurkovich | |
| 2007/0014185 | A1 * | 1/2007 | Diosse | B01F 5/241 |
| | | | | 366/9 |
| 2008/0124179 | A1 | 5/2008 | Fleckten | |
| 2008/0191153 | A1 | 8/2008 | Marganski et al. | |
| 2009/0304461 | A1 | 12/2009 | Strohschein | |
| 2010/0193077 | A1 | 8/2010 | Nelson | |
| 2012/0192711 | A1 | 2/2012 | Henningsen et al. | |
| 2016/0009488 | A1 | 1/2016 | Hudalla et al. | |
| 2016/0016729 | A1 | 1/2016 | Hudalla et al. | |
| 2017/0210574 | A1 | 7/2017 | Ellis et al. | |

OTHER PUBLICATIONS

FLSmidth, "Reagent Handling Systems for the Power Industry", FLSmidth Inc., Mar. 2006 (6 pages).
Notification of Transmittal of International Search Report and The Written Opinion of the International Searching Authority for PCT/US2014/052160, dated Dec. 17, 2014.
Vanderwerff, Dry Bulk Sorbent Injection Systems, Nol-Tec Systems, 2009 http://www.nol-tecasia.com.sg/pdf/dry-sorbent-injection-mitigation-system.pdf (2 pages).
Nol-Tec Systems, Inc., USPTO Office Action, U.S. Appl. No. 14/770,933, dated Apr. 20, 2017 (31 pages).
USPTO Final Office Action, U.S. Appl. No. 14/770,933, dated Oct. 26, 2017 (12 pages).
USPTO Office Action, U.S. Appl. No. 14/771,027, dated Jan. 26, 2018 (12 pages).
USPTO Office Action, U.S. Appl. No. 15/475,549, dated Apr. 4, 2018 (13 pages).

* cited by examiner

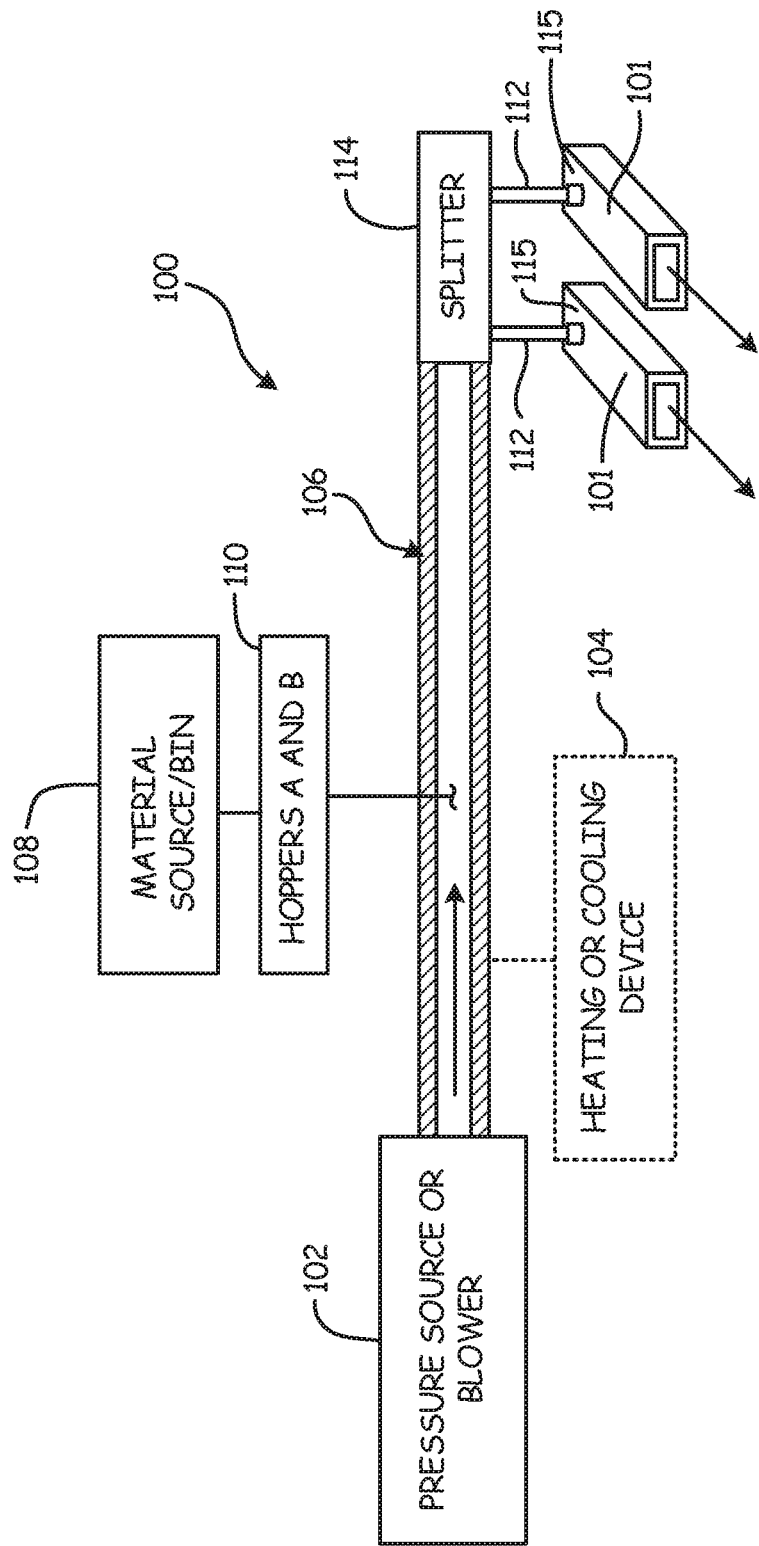

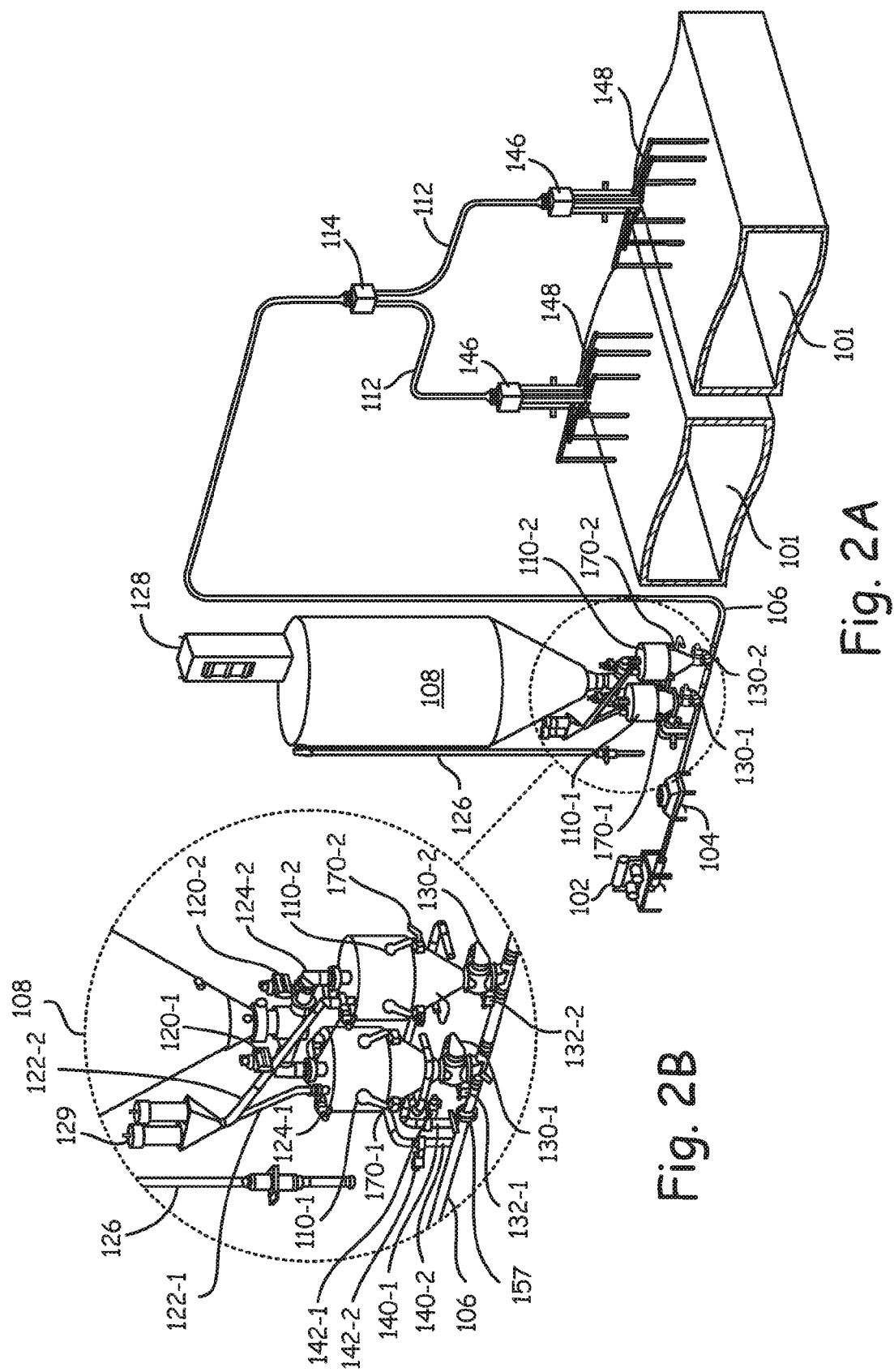

DISPENSING ASSEMBLY WITH CONTINUOUS LOSS OF WEIGHT FEED CONTROL

PRIORITY CLAIM TO PROVISIONAL APPLICATION

The present application claims priority to U.S. Provisional Application Ser. No. 61/868,247 filed Aug. 21, 2013 for a "MATERIAL DELIVERY SYSTEM WITH CONTINUOUS LOSS OF WEIGHT FEED CONTROL" the content of which is incorporated by reference in its entity into the present application.

BACKGROUND

Ever increasing environmental concerns have led industrial boilers and electric generating units (EGUs) to seek reliable cost-effective methods to control sulfur and mercury emissions. Dry bulk sorbent injection systems have been used to mitigate $SO_2$, $SO_3$, Hg, HCl, and HF emissions from these large industrial boilers. These systems convey sorbent materials, such as powder activated carbons from storage bins or hoppers through a convey line to injection ports on boiler flue gas ducts for the reduction of acid gases and mercury. The injected sorbent material captures with the pollutants in the flue gas to effectively and efficiently reduce emissions. Typically sorbent material is dispensed from the storage bin or hopper through an inlet to the convey line. Convey pressure is supplied to the convey line to transport the sorbent material or powder from the inlet to the injection ports. The quantity of sorbent material injected or dispensed into the convey line is measured to comply with emission regulations. The discussion above is merely provided for general background information and is not intended to be used as an aid in determining the scope of the claimed subject matter.

SUMMARY

The present application generally relates to embodiments of a dispensing assembly for providing continuous loss of weight feed control to measure and control the quantity of sorbent material dispensed into a convey line from multiple hoppers. The assembly described has application for dispensing sorbent materials or fluidized powders into a convey line but can be adapted for other applications or materials. In illustrative embodiments, input from load cells for multiple hoppers is used to control a feed rate of a feed device to provide continuous loss of weight feed control for continuous injection of material to the convey line. The application discloses a controller device configured to utilize input from a first load cell for a first hopper and a second load cell for a second hopper to determine a mass flow rate which is used to increase or decrease the feed rate so that dispensed flow rate of material into the convey line matches a set mass flow rate of material. In an illustrated embodiment, the multiple hoppers are coupled to the convey line in parallel and the system utilizes input from the multiple load cells during a transition phase when dispensing operation is switched from a first hopper to a second hopper. In another illustrated embodiment, the multiple hoppers are connected to the convey line in series through a feed device and the input from multiple load cells is utilized to control the feed rate when dispensing material from a second hopper through the first hopper into the convey line. The feed control scheme utilizing input from the multiple load cells can be used to control the feed rate for different arrangements or devices and is not limited to the specific embodiments disclosed. The system as described provides continuous loss of weight feed control to eliminate the need for volumetric feed control during operating periods while a hopper is refilled and/or while dispensing operation is transferred from one hopper to another hopper.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 illustrates a material delivery system for injecting sorbent materials into a flue or duct.

FIGS. 2A-2B illustrate one embodiment of a material delivery system utilizing a plurality of hoppers for continuous feed or injection of material into a convey line.

DETAILED DESCRIPTION OF ILLUSTRATIVE EMBODIMENTS

Figure 2C:
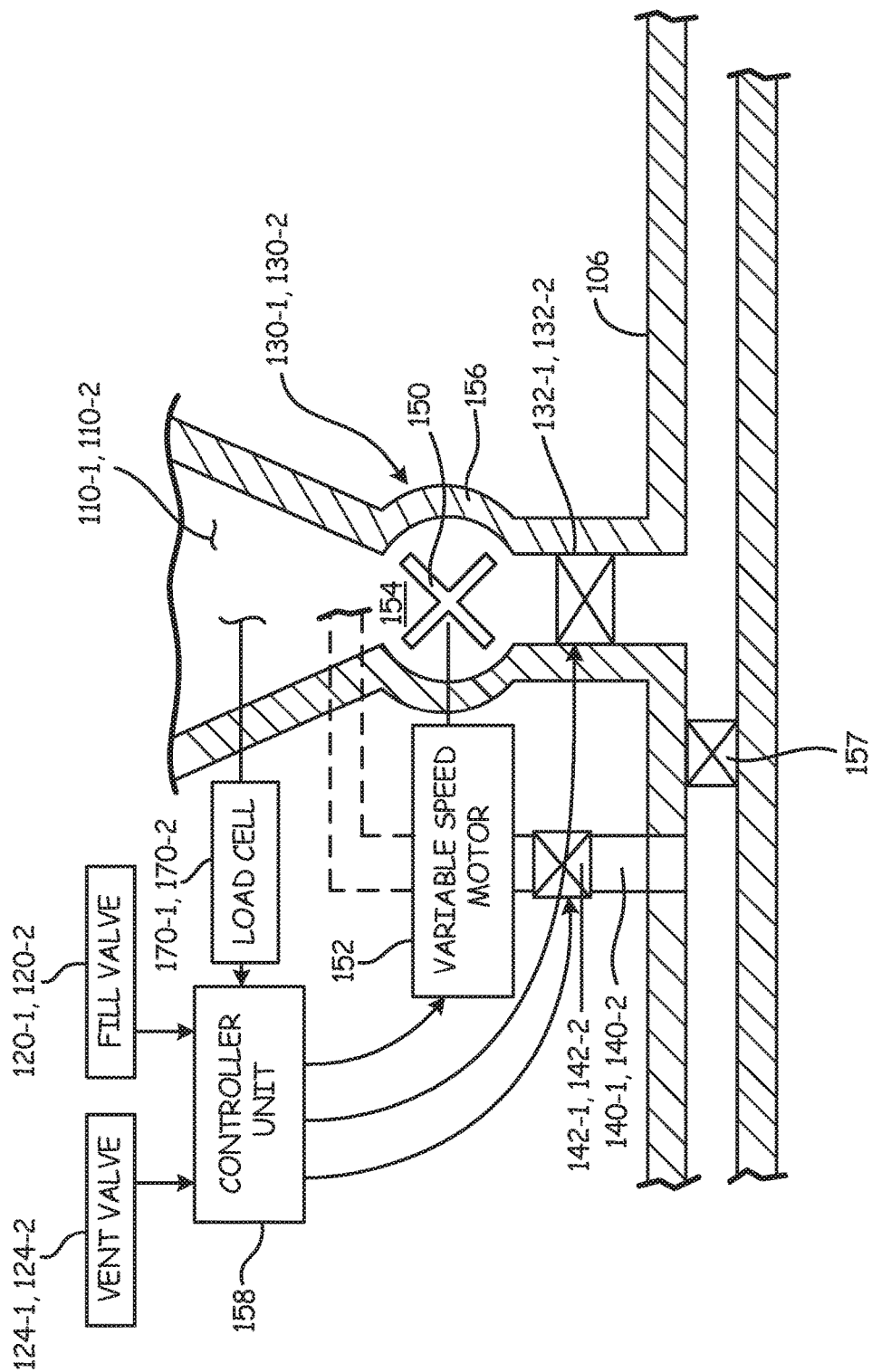
FIG. 2C illustrates a feed device and controller unit for a dispensing assembly illustrated in FIGS. 2A-2B.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The present application describes a material delivery system 100 or pneumatic conveying system which can be used to deliver sorbent materials or powder for injection into a gas stream of a flue or duct 101 of a boiler to neutralize pollutants or gases discharged to the flue or ducts 101. Illustrative sorbent materials includes powder activated carbon or other fluidizable material and application of the dispensing assembly is not limited to a particular material. As schematically illustrated in FIG. 1, the system includes a pressure source or blower 102 and a heater or cooling device 104 to provide temperature controlled pressurized air to convey line 106 upstream of injection of material into the convey line 106. The sorbent material or powder is supplied from a source or bin 108 into the convey line 106 downstream from the pressure source or blower 102 to convey the fluidized material or powder for injection into the flues or ducts 101. In the present application, material from source or bin 108 is supplied to the convey line 106 via multiple hoppers 110 (hoppers A and B) to continuously deliver material to the convey line 106. In the application shown, the fluidized material from convey line 106 is split into multiple feed lines 112 at splitter 114 for injection into multiple ducts or flues 101 through injection ports 115 as shown.

FIGS. 2A-2B illustrates an embodiment of the delivery system utilizing multiple hoppers 110-1, 110-2 connected in parallel to the convey line 106 to dispense material to the pressurized air stream. Operation of the hoppers 110-1, 110-2 is coordinated to fill the hoppers with material during a filling phase and to dispense material from the hoppers 110-1, 110-2 during a dispensing phase. Sorbent material stored in bin 108 is used to fill each of the multiple hoppers 110-1 110-2 during the filling phase. The flow of material from the bin 108 to the hoppers 110-1, 110-2 for the filling phase is controlled via operation of fill valves 120-1, 120-2. Illustratively, fill valves 120-1, 120-2 are opened and closed to discharge material from the bin 108 to fill the hoppers 110-1, 110-2. Bin 108 is above hoppers 110-1, 110-2 to fill the hoppers utilizing a gravity feed.

As shown, each of hoppers 110-1, 110-2 is vented to atmosphere during the filling phase through vent line 122-1, 122-2 connected to the hoppers 110-1, 110-2 through vent valves 124-1, 124-2. The bin 108 as shown in FIG. 2A is filled from a truck through fill line 126. As shown the bin 108 includes dust collector 128 to reduce contaminants. Vent lines 122-1, 122-2 are closed to dispense material from the hoppers 110-1, 110-2. Hoppers 110-1, 110-2 are opened to atmosphere through dust filters 129 to reduce contaminant in the convey line 106. Bin 108 includes a manual maintenance valve to provide manual access and control to open and close the discharge outlet from bin 108.

In the illustrated embodiment shown in FIGS. 2A-2B, the hoppers 110-1, 110-2 form upstream U and downstream D hoppers 110-1, 110-2 configured to reciprocally fill and dispense material. During the dispensing phase, material is discharged from each of the upstream and downstream hoppers 110-1, 110-2 through feed devices 130-1, 130-2 connected to convey line 106 through dispense valves 132-1, 132-2. Hoppers 110-1, 110-2 are pressurized via air pressure from convey line 106 upstream of the injection ports to form pressurized containers for dispensing material. As shown, the containers are pressurized through pressurization lines 140-1, 140-2 connected to the convey line 106 and hoppers 110-1, 110-2. The pressurization lines 140-1, 140-2 are opened and closed through pressurization valves 142-1, 142-2. For dispensing, valves 142-1, 142-2 are opened to equalize the pressure between the convey line 106 and the containers to reduce pressure loss or differential between the containers and convey line 106 to reduce leakage which can interfere with injection of material into the convey line 106. As shown, splitters 146 along feed lines 112 distribute material to lances 148 for injection into ducts or flue 101.

In the embodiment shown in FIG. 2C, the feed device 130-1, 130-2 is an adjustable/variable rate feed device 130-1, 130-2. In the illustrated embodiment, the variable rate feed device includes rotary vanes 150 rotated through a variable speed motor 152 illustrated diagrammatically. The vanes 150 rotate in chamber 154 disposed between the hoppers 110-1, 110-2 and the convey line 106. The feed device 130-1, 130-2 can include any number of vanes 150 and application is not limited to a particular number shown. The rotary feed device 130-1, 130-2 and dispensing components are coupled to the convey line 106 through a flexible line adapter (not shown) to assembly components of the material dispensing system to the convey line 106. In an illustrated embodiment, the vanes 150 include flaps to reduce clearance between the vanes 150 and chamber walls 156 to provide an airlock rotary feed device to reduce air leakage from the convey line 106. To reduce corrosion, rotary vanes 150 are coated with a corrosive or erosion resistance material to protect from corrosion and erosion. As shown, the convey line 106 includes a manual throttle valve 157 which is adjusted to control the velocity of the air flow to provide a fluid stream to move the injected sorbent material along the convey line 106.

In illustrated embodiments, the fill valves 120-1, 120-1, vent valves 124-1, 124-2, dispense valves 132-1, 132-2 and pressurization valves 142-1, 142-2 are pneumatic valves. Although illustrated embodiments described herein employ pneumatic valves and devices, application is not limited to pneumatic valves and other valves such as electric or hydraulic valves can be used as appreciated by those skilled in the art. Furthermore, application is not limited to the rotary feed device and other feed devices 130-1, 130-2 such as vibratory feed devices can be used.

In the embodiment shown, the system includes separate pressurization lines 140-1, 140-2 connecting the line pressure to the hoppers 110-1, 110-2. In an alternative embodiment both the upstream and downstream hoppers 110-1, 110-2 are pressurized through one pressurization line coupled to the convey line 106. A multiple position valve (not shown) is used to selectively open and close each of the hoppers 110-1, 110-2 to the convey line pressure. In particular in a first valve position, the pressurized air is provided to the upstream hopper 110-1 and in the second valve position, pressurized air is provide to the downstream hopper 110-2 to alternately provide convey line pressure during the dispensing phase.

Operation of the feed devices 130-1, 130-2, pressurization valves 142-1, 142-2, vent valves 124-1, 124-2, fill valves 120-1, 120-2 and dispense valves 132-1, 132-2 is controlled via a controller unit 158 including hardware/software components (not shown). The controller unit 158 is programmed to operate the fill and vent valves 120-1, 12-2, 124-1, 124-2 to the upstream and downstream hoppers 110-1, 110-2 and the pressurization valves 142-1, 142-2 and dispense valves 132-1, 132-2 in sequence to fill and dispense material from the pressurized hoppers 110-1, 110-2 as illustrated in Table II below where $t_1$ and $t_2$ are different times and $t_2 > t_1$. The controller unit 158 also controls the feed rate of the feed drives 130-1, 130-2 (or the speed of motors—illustratively shown).

TABLE II

| Time 1 ($t_1$) | Time II ($t_2$) |
| --- | --- |
| Upstream hopper filling (fill and vent valves open-dispense valve closed) | Downstream hopper filling (fill and vent valves open-dispense valve closed) |
| Downstream hopper dispensing (dispense and pressurization valves open-fill and vent valves closed) | Upstream hopper dispensing (dispense and pressurization valves open-fill and vent valves closed) |

Figure 3A:
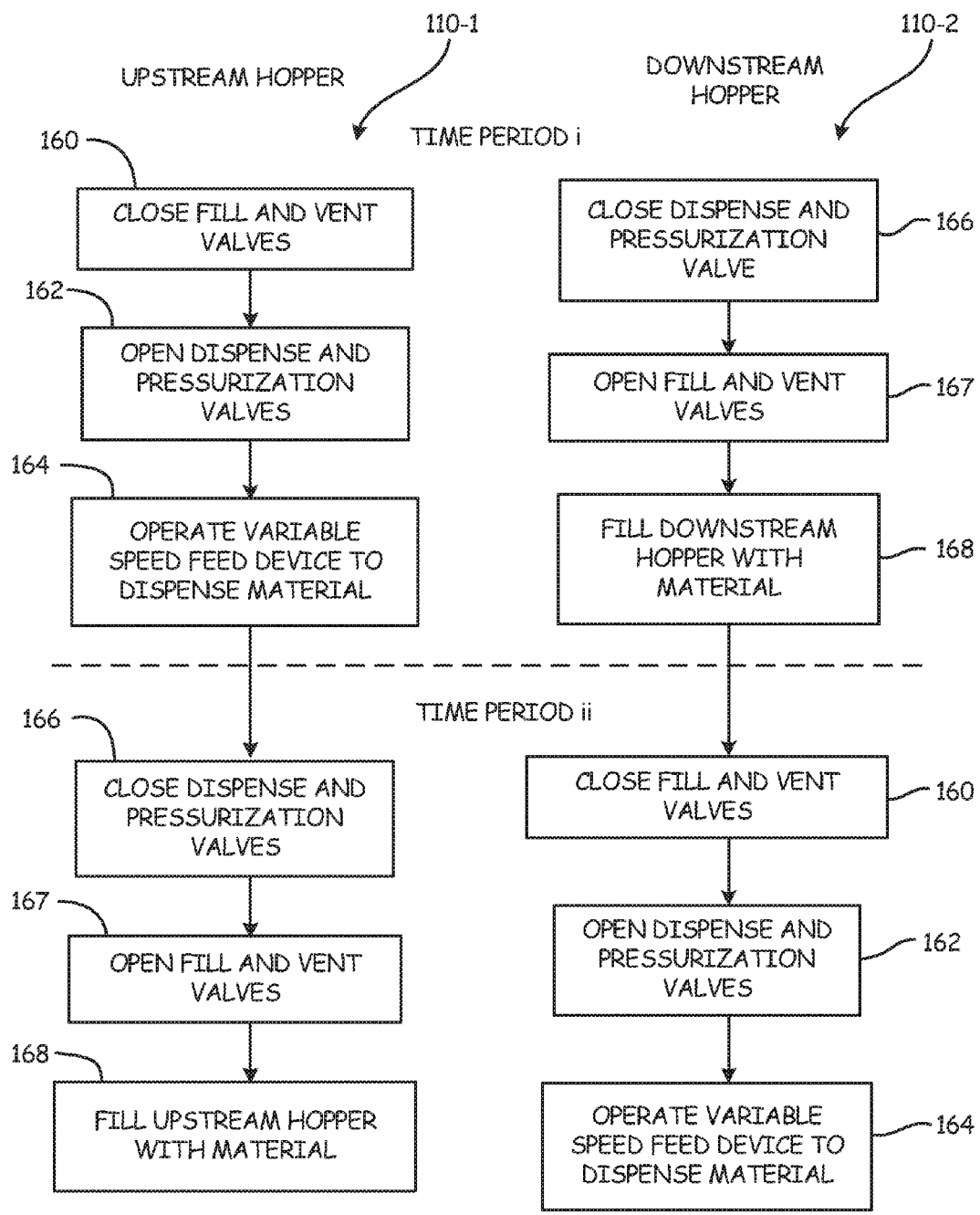
FIG. 3A is a flow chart for alternating filling and dispensing phases for the multiple hoppers illustrated in FIGS. 2A and 2B

FIG. 3A illustrates process steps to coordinate filling and dispensing cycles for the multiple hoppers. 110-1, 110-2 connected in parallel to the convey line 106. As shown during a first time/dispensing period i, the upstream hopper 110-1 is in the dispensing phase and the downstream hopper 110-2 is in the filling phase. In the dispensing phase, the vent and fill valves 120-1, 124-2 of the upstream hopper 110-1 are closed in step 160. In step 162, the pressurization valve 142-1, and dispense valves 132-1 are opened and in step 164, the feed device 130-1 operates to dispense material from the upstream hopper 110-1 to the convey line 106. Following completion of the dispensing phase, the hopper 110-1 is filled during a second time/dispensing period ii while material is dispensed from the downstream hopper 110-2. During the second time/dispensing period ii, the dispense valve 132-1 and pressurization valve 142-1 are closed in step 166 and the fill valve 120-1 and vent valve 124-1 are opened in step 167 to fill the hopper 110-1 as illustrated in step 168.

As shown, during the first time period i, the downstream hopper 110-2 is in the filling phase. During the filling phase, the pressurization valve 142-2 and dispense valve 132-2 are closed in step 166 and vent valve 124-2 and fill valve 120-2 for the downstream hopper 110-2 are opened in step 167 to fill the downstream hopper 110-2 as illustrated in step 168. During the second time period ii, following completion of the dispensing phase for the upstream hopper 110-1, the vent valve 124-2 and fill valve 120-2 are closed in step 160 and the pressurization valve 142-2 and dispense valve 132-2 are opened in step 162. In step 164, the feed device 130-2 operates to dispense material from the downstream hopper 110-2 to the convey line 106.

In the embodiment shown in FIG. 2C, each of the hoppers includes a load cell 170-1, 170-2 to measure the weight of material in the containers or hoppers 110-1, 110-2. Input from load cells 170-1, 170-2 for each of the hoppers 110-1, 110-2 is used to actively control the speed of the feed devices 130-1, 130-2 to provide a set quantity or mass flow rate of material dispensed. Input from the load cells 170-1, 170-2 provides a loss of weight or mass flow rate of material dispensed to the convey line 106 as shown below where $t_1$ and $t_2$ are different times, where $t_2 > t_1$ and weight $t_2$ and weight $t_1$ are the weights measured by the loads cells 170-1, 170-2 at each time $t_1$ and $t_2$ $$\text{Mass Flow Rate} = \frac{\text{Weight } t2 - \text{Weight } t1}{t2 - t1}$$

The controller unit 158 shown in FIG. 2C uses a proportional integral derivative (PID) control scheme or other feedback control logic to control the motor or feed device rate/speed to maintain a set dispense or mass flow rate during the dispensing phase for each hopper 110-1, 110-2 utilizing the input from the load cells 170-1, 170-2. The controller unit 158 also utilizes the input from the load cell 170-1, 170-2 to detect when the material level in each of the hoppers 110-1, 110-2 is low to switch operating phases for the hoppers 110-1, 110-2. During a transition time period between time period i and time period ii when one feed device shuts down and another ramps up, measurement of the mass flow rate is interrupted which can interfere with accurate measure of material dispensed.

Figure 3B:
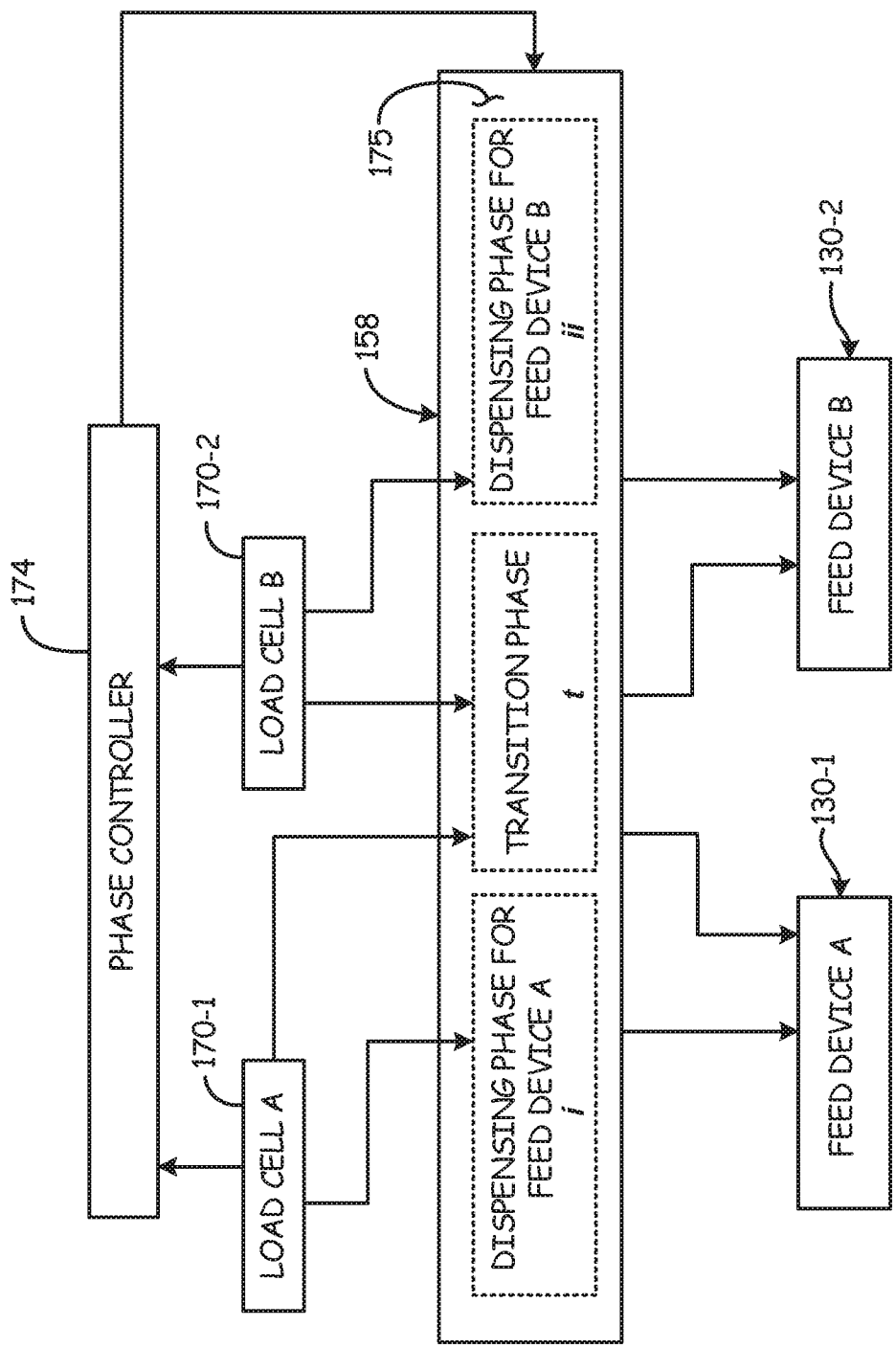
FIG. 3B illustrates controller operations for the multiple hoppers of the dispensing assembly illustrated in FIGS. 2A-2B.

FIG. 3B illustrates a control scheme for provide a loss of weight or mass flow rate control during the transition time period between the dispensing phase for hopper 110-1 and the dispensing phase for hopper 110-2 when hopper's 110-1 feed rate slows down and hopper's 110-2 feed rate speeds up, The control scheme is implemented through a phase controller 174 and mass flow controller 175 of the controller unit 158 utilizing feedback from the load cells 170-1, 170-2 to provide a means for controlling the adjustable feed rate of the feed devices 130-1, 130-2 for hoppers 110-1, 110-2. The phase controller 174 implements the dispensing phase for hopper 110-1 during the first time period i and the dispensing phase for hopper 110-2 during the second time period ii. During the first time period i the mass flow rate of material dispensed from hopper 110-1 is actively controlled through controller unit 158 using input from load cell 170-1 to increase or decrease the speed of the feed device 130-1 or motor to maintain the desired or set mass flow rate of material dispensed from hopper 110-1. During the second time period ii the mass flow rate from hopper 110-2 is controlled via the controller unit 158 utilizing input from load cell 170-2 to maintain the desired or set flow rate of material dispensed from hopper 110-2.

During the dispensing phase for hopper 110-1, the phase controller 174 monitors input from load cell 170-1 to detect if a fill level of the hopper 110-1 is at or below a threshold level. When the fill level or weight drops below the threshold level, the phase controller 174 shifts dispensing operation from hopper 110-1 to hopper 110-2 for the second time period ii. As the dispensing phase shifts from hopper 110-1 to hopper 110-2, the controller unit 158 utilizes input from both load cells 170-1, 170-2 to control the mass flow rate of material dispensed during the transition phase based upon the mass flow rate calculated using input from both the load cells 170-1, 170-2. Thus the controller unit 158 as described provides a means for adjusting the feed rate responsive to input from one of the first or second load cells 170-1, 170-2 during one time period and both the first and second load cells 170-1, 170-2 during a different or transition time period.

Thus, motor speed or feed rate is increased or decreased to adjust the mass flow rate depending upon the feedback from the load cells 170-1, 170-2. During the transition time period t the controller unit 158 closes both fill valves 120-1, 120-2 and vent valves 124-1, 124-2. Following completion of the transition phase, feed device 130-1 is idled and the dispensing valve 132-1 and pressurization valves 142-1 are closed and feed device 130-2 is actively controlled utilizing input from load cell 170-2 to dispense material at the desired mass flow rate. In one embodiment, the controller unit 158 uses a preset time to ramp up/ramp down the feed rate or speed of the feed devices 130-1, 130-2 during the transition phase t. As the speed of the feed devices 130-1, 130-2 ramps up/down, the speed of feed device 130-1 or 130-2 are actively controlled using input from both load cells 170-1, 170-2. Following the preset time, feed device 130-1 is idled and active control of feed device 130-2 is implemented via controller unit 158 utilizing input from load cell 170-2. Similarly, during the dispensing phase of feed device 130-2, the phase controller 174 monitors the fill level of hopper 110-2 and shifts dispensing to hopper 110-1 if the fill level of hopper 110-2 is below the threshold level.

In the illustrated embodiment, the controller unit 158 is implemented through hardware devices/circuitry. In illustrated embodiments, the controller unit 158 includes algorithms or instructions stored on one or more hardware devices such as ROM, RAM and solid state memory devices and the instructions are implemented through one or more processing unit. Although the phase controller 174 is illustrated separately, the functions of the phase controller 174 and other components of the controller unit 158 disclosed herein can be implemented through a common controller device or circuit board.

Figure 3C:
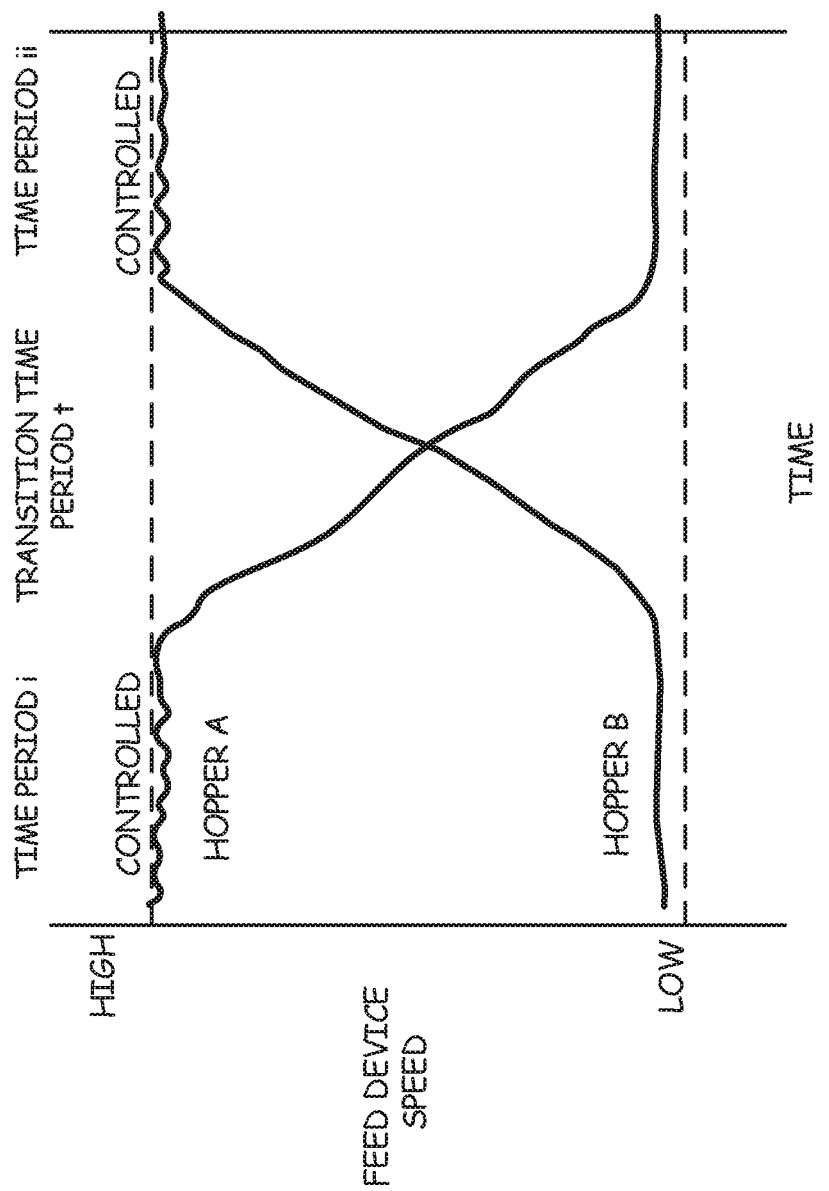
FIG. 3C illustrates feed device speed vs time for the multiple hoppers.

FIG. 3C illustrates speed of the feed devices 130-1, 130-2 during time periods i and ii and transition time period t. As shown in FIG. 3C, during time period i, feed device 130-1 is at full speed and is controlled utilizing feedback from load cell 170-1 while feed device 130-2 is idle. During the time period ii, feed device 130-2 is at full speed and is controlled utilizing feedback from load cell 170-2 while feed device A 130-1 is idle. During the transition time period t, the speed of device 130-1 or 130-2 is reduced and the speed of feed device 130-2 or 130-1 increases and the feed rate is controlled utilizing input from both load cell 170-1 and load cell 170-2. As previously described, the phase controller 174 compares the weight from the load cell 170-1 to a threshold weight to shift the dispensing operations from hopper 110-1 to hopper 110-2 and the weight from the load cell 170-2 to shift dispensing operations from hopper 110-2 to hopper 110-1.

Figure 3D:
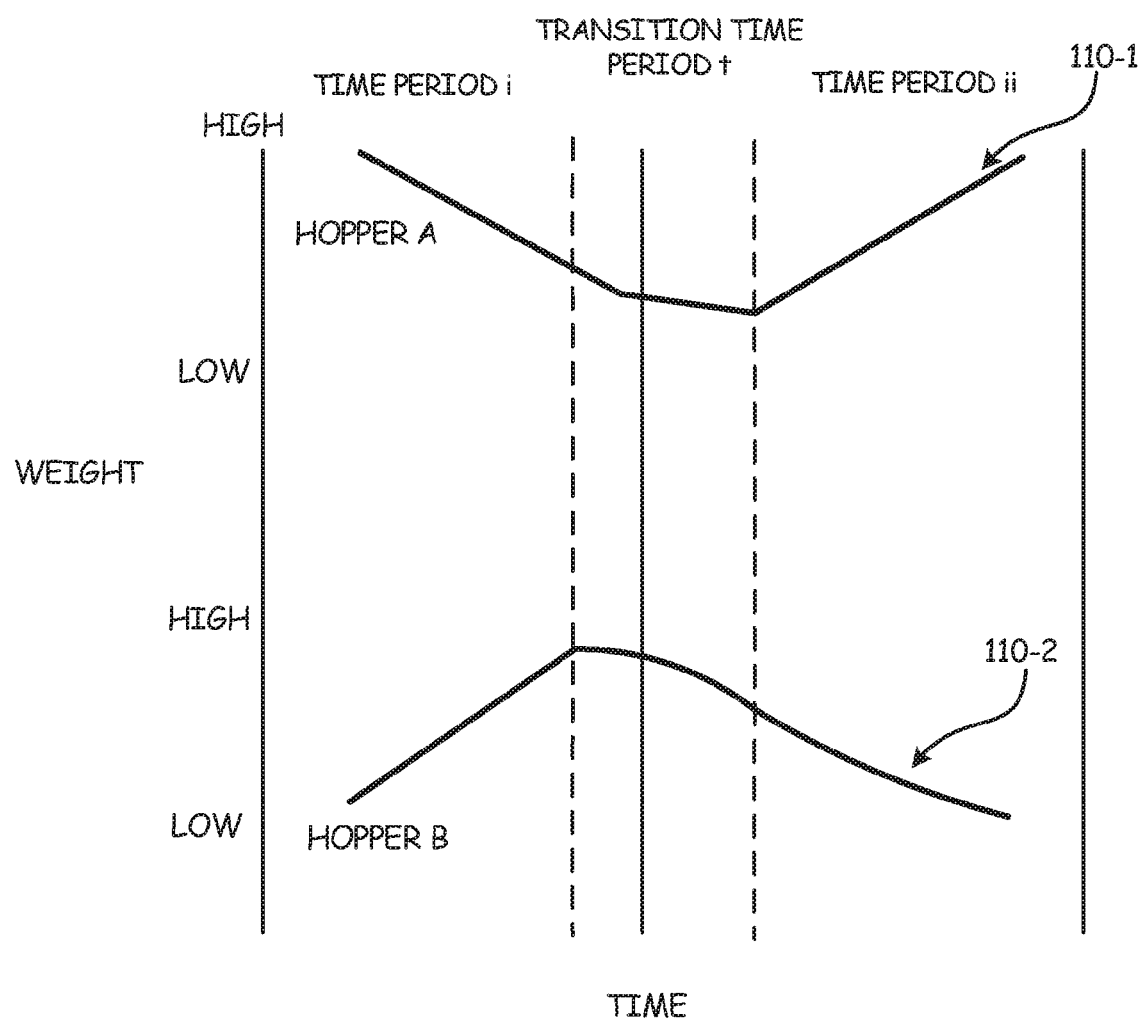
FIG. 3D illustrates weight for the multiple hoppers during multiple dispensing or time periods.

FIG. 3D illustrates the weight of the hoppers 110-1, 110-2 with respect to time as measured by the load cells 170-1, 170-2. In the illustrated embodiment, in time period i, material is dispensed from hopper 110-1 and filled in hopper 110-2. As material is dispensed, the weight of hopper 110-1 decreases and as hopper 110-2 is filled, the weight increases as shown. As previously described, the phase controller component 174 compares the weight from the load cell 170-1 to a threshold weight to shift from the time period i to the transition time period t. During the transition time period t, material is dispensed from both hopper 110-1, 110-2 as previously described and as graphically illustrated in FIG. 3D. During time period ii, the weight of hopper 110-2 decreases as material is dispensed and the weight of material in hopper 110-1 increases as hopper 110-1 is filled. In the illustrated embodiment, mass flow rate as measured by the respective load cells 170-1, 170-2 is used to control the feed rate during each of the time periods i and ii for hoppers 110-1, 110-2 and as measured by both load cells 170-1, 170-2 during the transition time period t to provide an accurate measure of material dispensed.

Figure 3E:
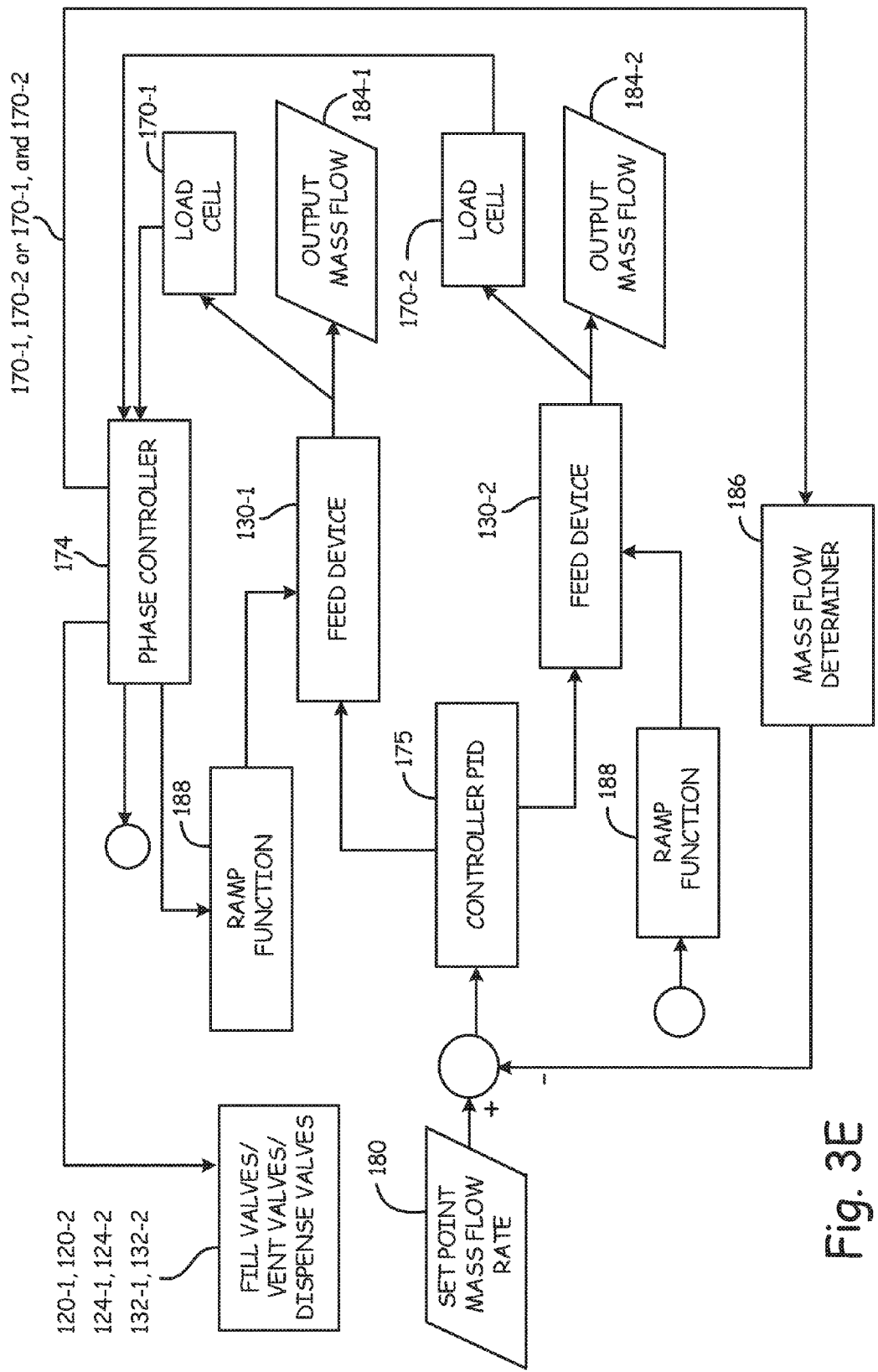
FIG. 3E illustrates an embodiment of a control scheme utilizing input from load cells for multiple hoppers to provide continuous loss of weight feed control for continuous injection of material via multiple hoppers.

FIG. 3E illustrates an embodiment of a control scheme for continuous flow control for hoppers 110-1, 110-2 utilizing feedback from multiple load cells 170-1, 170-2. As shown, the control loop receives a set control mass flow rate 180 which the mass flow rate controller 175 uses to increase or decrease the speed or feed rate of the feed devices 130-1, 130-2 to provide an output mass flow 184-1, 184-2 from hoppers 110-1, 110-2 (not shown) to the convey line 106. As previously described feed device 130-1 feeds material from hopper 110-1 to the convey line 106 and feed device 130-2 feeds material from hopper 110-2 to the convey line 106. Load cells 170-1, 170-2 measure the weight of material in hoppers 110-1, 110-2 which is used to calculate the output mass flow rate 184-1, 184-2 dispensed from the hoppers 110-1, 110-2. Input from load cells 170-1, 170-2 is used by a mass flow rate determiner 186 to calculate the combined mass flow rate of material dispensed from hoppers 110-1, 10-2 into the convey line via feed devices 130-1, 130-2.

As shown, output from the mass flow rate determiner 186 is compared to the set control mass flow rate 180 to provide an error input to the mass flow rate controller 175. The controller 175 uses the input error to adjust the rate or speed of the feed devices 130-1, 130-2 to match the set control mass flow rate 180. As shown, depending upon the operating period or phase, inputs from one or both of the load cells 170-1, 170-2 are used by the mass flow determiner 186 to calculate the output mass flow rate of material dispensed. The mass flow determiner 186 uses the phase input or algorithm logic to eliminate or filter input from the load cell 170-1 or 170-2 while the hoppers 110-1 or 100-2 are filled. In particular, when hopper 110-1, or 110-2 is filled, the weight of the hopper 110-1, or 110-2 increases thus, there is no loss of weight corresponding to a mass flow rate of material dispensed. Thus, the input from the load cell 170-1 or 170-2 while the hopper 110-1 or 110-2 is filled is not used to determine the mass flow rate. As shown, during the transition time period t the mass flow rate controller 175 can adjust the feed rate of one or both of the feed devices 130-1, 130-2 to match the set mass flow rate 180.

Feedback from the load cells 170-1, 170-2 is provided to the phase controller 174 to alternate dispensing phases between feed device 130-1 and feed device 130-2 so that while feed device 130-1 is dispensing material from hopper 110-1, hopper 110-2 is filled and while feed device 130-2 is dispensing material from hopper 110-2, hopper 110-1 is being filled. The phase controller 174 utilizes the feedback from the load cells 170-1, 170-2 to determine when to switch operation between the dispensing phase for feed device 130-1 and the dispensing phase for feed device 130-2 as previously described. When the input weight from load cell 170-1 drops below the threshold level, the phase controller 174 switches dispensing operation to feed device 130-2. During the transition phase t the feed devices 130-1, 130-2 utilize a ramp up/down function 188 to ramp up/down the feed rate to transition between the dispensing and filling phases. In particular, a ramp down function is used to slow the feed rate of feed device 130-1 and a ramp up function is used to ramp up the speed of the feed device 130-2 during the transition phase t from the dispensing phase for feed device 130-1 to the dispensing phase for feed device 130-2.

Thus as described, the system provides continuous loss of weight feed control eliminating the need for volumetric feed control schemes while the hoppers 110-1, 110-2 are refilled and as described, while dispensing operations transition from one hopper 110-1 to the other hopper 110-2.

Figure 4:
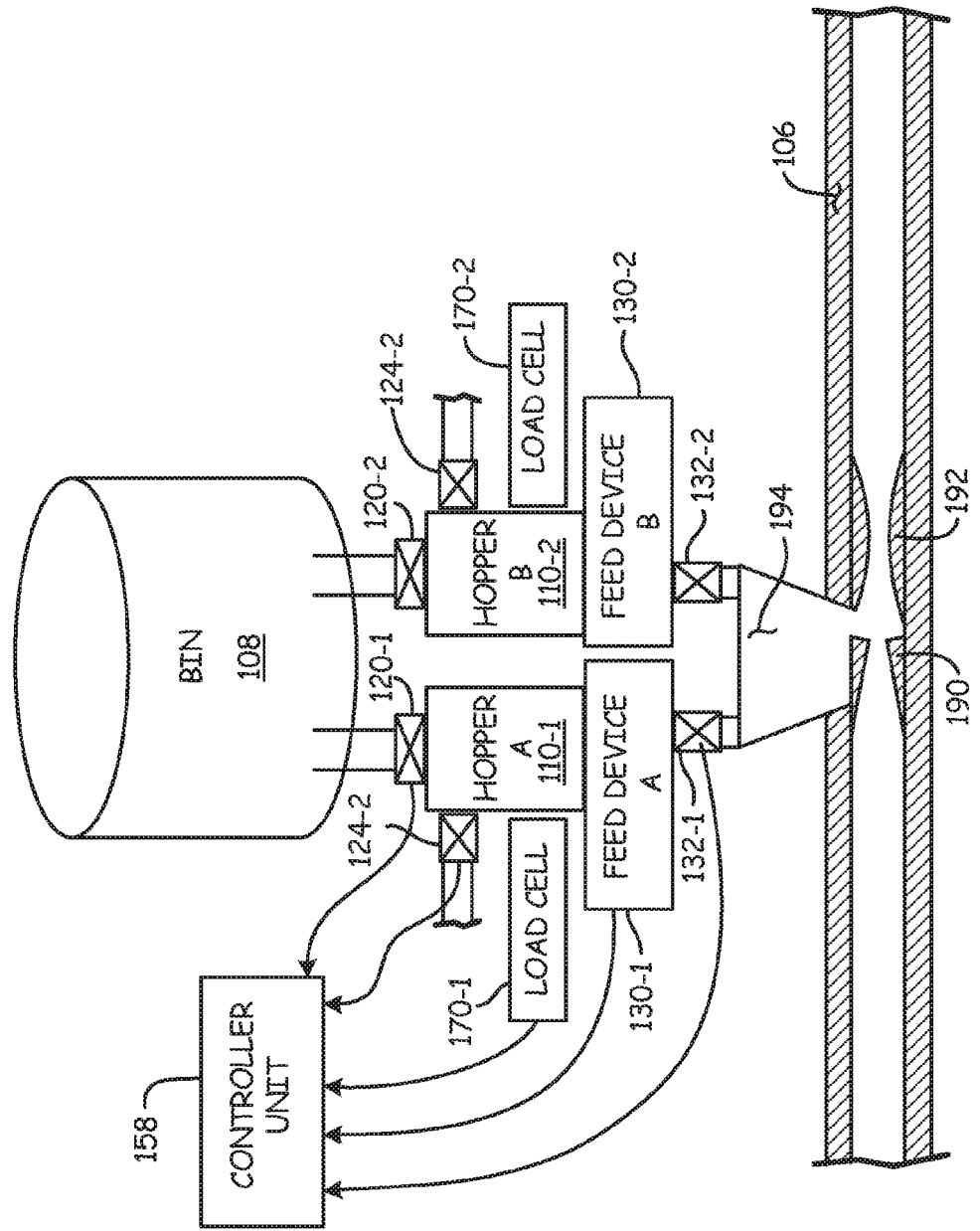
FIG. 4 illustrates an eductor injection system including multiple hoppers to supply material for continuous injection of material into the convey line.

FIG. 4 illustrates an alternate embodiment of a material dispensing system utilizing multiple hoppers 110-1, 110-2 and eductor for continuous dispensing of material to the convey line 106. As previously described, the multiple hoppers 110-1, 110-2 alternate between dispensing and filling phases. During the filling phase, hoppers 110-1, 110-2 are vented to ambient via vent valves 122-1, 122-2. Material dispensed from hoppers 110-1, 110-2 is injected into the convey line 106 through injection inlet disposed between a nozzle 190 and diffuser 192 of the educator to convey the injected material along the convey line 106. Material is dispensed from the hoppers 110-1, 110-2 to a funnel 194 of the educator through variable speed or rate feed devices 130-1, 130-2. Illustrative feed devices 130-1, 130-2 include an auger device, a vibratory feed device or other feed device that has an adjustable feed rate or speed. Injected material is accelerated by the educator to draw material into the convey line 106.

In the embodiment shown, the system alternates between hoppers 110-1, 110-2 to dispense material similar to the embodiment illustrated in FIG. 2A-2B. In particular, during the dispensing phase for hoppers 110-1, 110-2, the mass flow rate controller 175 uses input from load cell A 170-1 to increase or decrease the speed of feed device or motor 130-1 to maintain a desired or set mass flow rate of material dispensed from hopper 110-1. During the dispensing phase for hopper 110-2, the phase controller 174 utilizes input from the load cell 170-1 to monitor the level of material. Once the phase controller 174 detects a low material level below the threshold level dispensing is transitioned from feed device 130-1 for hopper 110-1 to feed drive 130-2 for hopper 110-2. During the transition phase time t, the speed of feed device 130-1 is lowered and the speed of feed device 130-2 increases to dispense material from hopper 110-2 during the second time period ii. During the transition phase time t, input from both load cells 170-1, 170-2 is used to control the mass flow rate of material dispensed as previously described. Thus, the feed rate of one or both feed devices 130-1, 130-2 is increased or decreased to control the mass flow rate to the set point mass flow rate based upon the mass flow rate calculated from the input from both load cells 170-1, 170-2.

Following completion of the transition phase, feed device 130-1 is idled and the dispense valve 132-1 and pressurization valve 142-1 are closed and feed device 130-2 is actively controlled utilizing input from load cell 170-2 to dispense material at the desired mass flow rate. As previously described, following completion of the dispensing phase, dispensing valve 132-1 or 132-2 is closed and the fill valve 120-1 or 120-2 and vent valve 124-1 or 124-2 are opened to fill the hoppers 110-1, 110-2 and following the filling phase, fill valve 120-1 or 120-2 is closed and dispense valve 132-1 or 132-2 is opened to dispense material.

Figure 5:
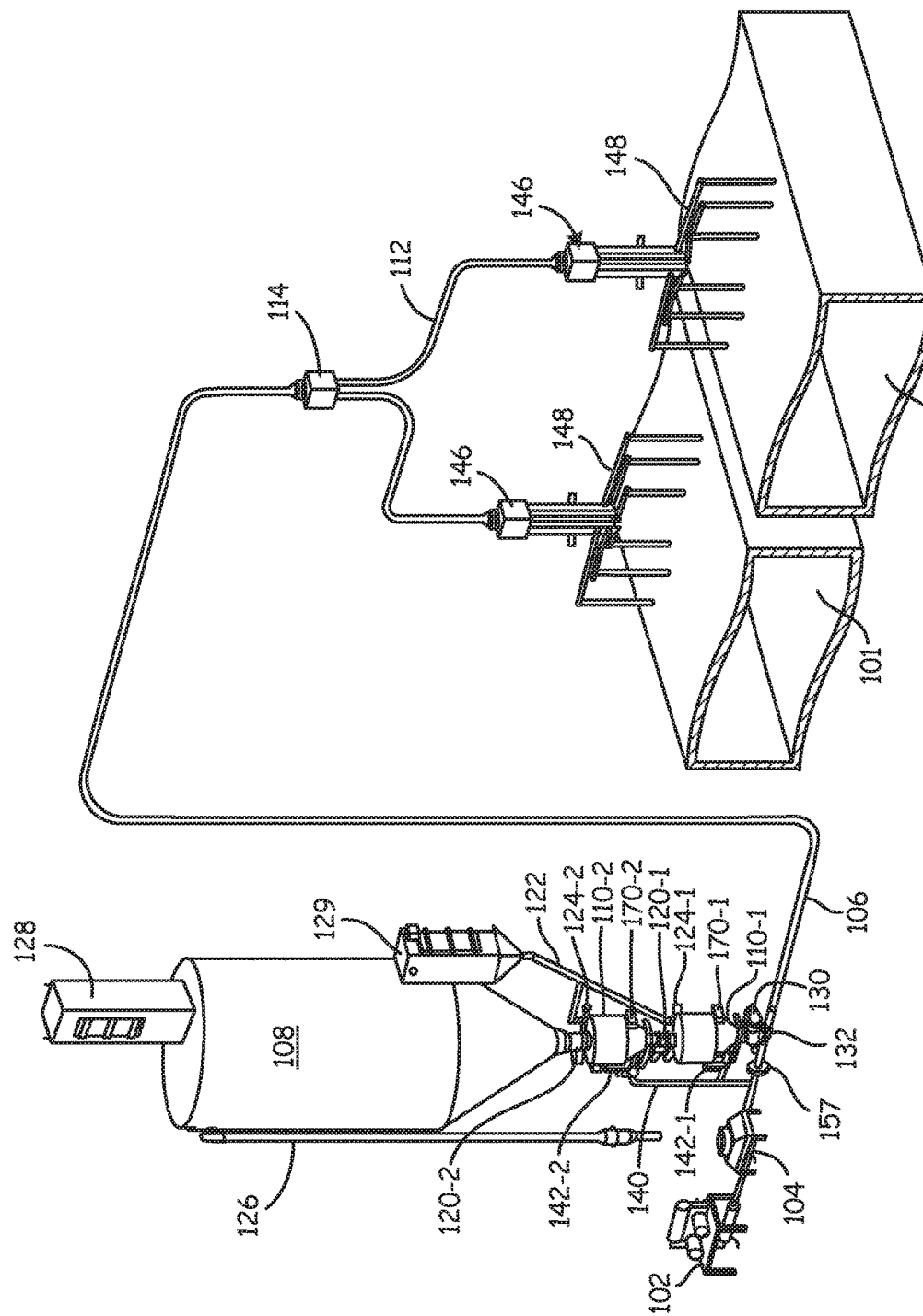
FIG. 5 illustrates another embodiment of a material delivery system utilizing a plurality of stacked hoppers for continuous injection of material into the convey line.

FIG. 5 illustrates an alternate embodiment of a dispensing system utilizing using multiple hoppers or containers 110-1, 110-2 connected to the convey line 106 through a single inlet. In the illustrated embodiment, the multiple containers or hoppers 110-1, 110-2 are connected in series to the material source or bin 108 to fill and dispense material. In the illustrated embodiment, the multiple hoppers or containers are above bin 108 for gravity feed of material from bin 108 into hoppers 110-1, 110-2. As shown, the upper hopper U 110-2 is coupled to bin 108 through fill valve 120-2 and lower hopper L 110-1 is coupled to upper tank U through fill valve 120-1 and coupled to convey line 106 through dispense valve 132 from the lower hopper L 110-1 to the convey line 106. A pressurization line 140 is coupled to hoppers through upper and lower pressurization valves 142-2, 142-1 and vent line is coupled to upper and lower hoppers through upper and lower vent valves 124-2, 124-1. Load cells 170-1, 170-2 measure load of the upper and lower hoppers 110-1, 110-2. As illustrated in the table IV below where time $t_2$>time $t_1$, while lower hopper 110-1 dispenses material to convey line 106, upper and lower hoppers 110-1, 110-2 are intermittently filled.

TABLE IV

| Time 1 ($t_1$) | Time 2 ($t_2$) |
|---|---|
| Upper hopper filling-upper fill and vent valve open-lower fill valve closed | Upper hopper filling lower hopper-lower fill valve open-upper fill valve and upper vent valve closed. |
| Lower hopper dispensing to convey line-lower pressurization valve and dispense valve open | Lower hopper dispensing to convey line-upper pressurization valve and dispense valve open |

Figure 6A:
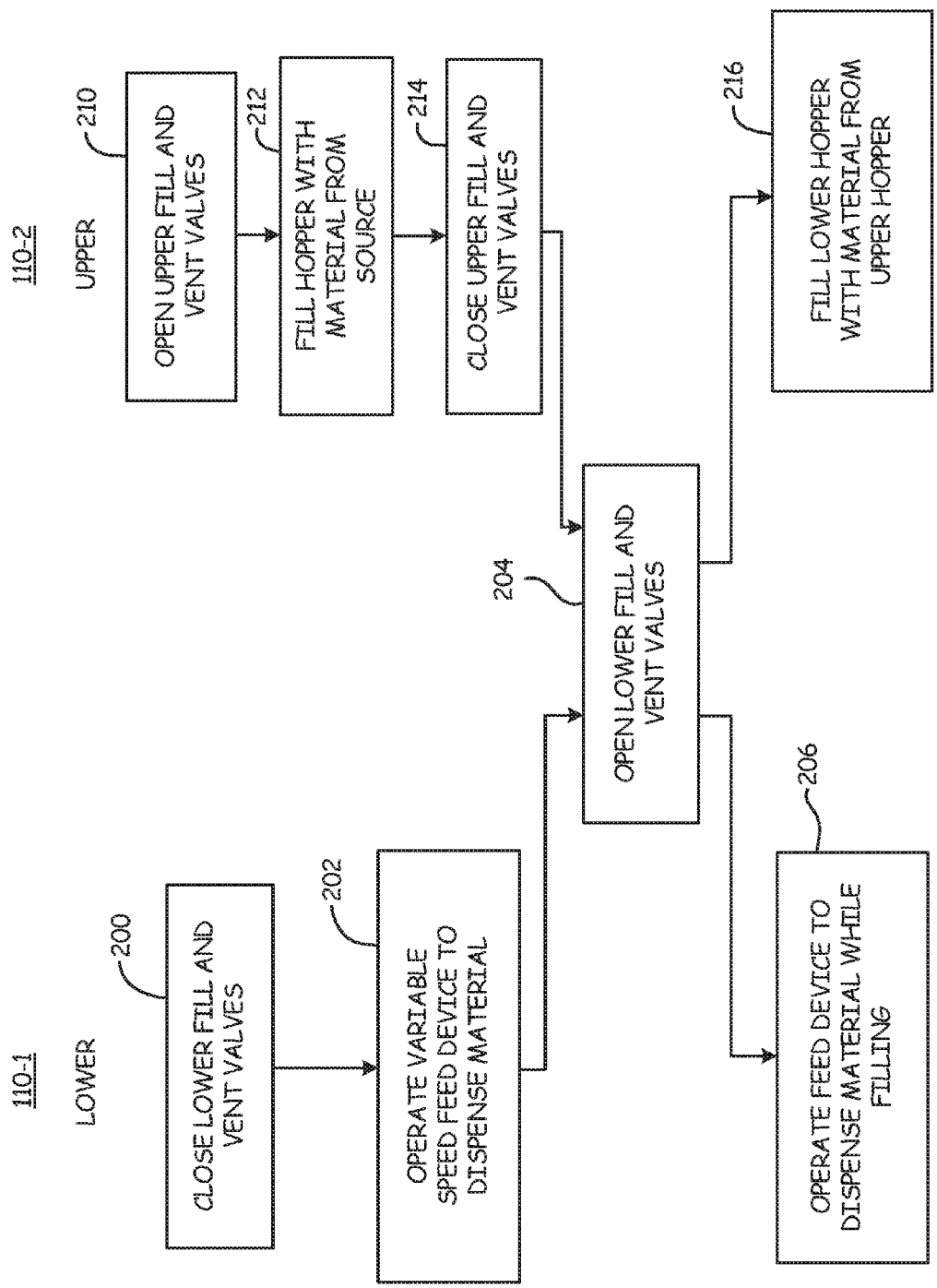
FIG. 6A is a flow chart illustrating a dispensing and filling sequence for upper and lower hoppers of the embodiment illustrated in FIG. 5.

FIG. 6A is a flow chart illustrating process steps for filling the upper and lower hoppers 110-1, 110-2 in sequence while continuously dispensing material from the lower hopper 110-1 to the convey line 106. In step 200 the lower fill valve 120-1 and vent valve 124-1 are closed between the upper and lower hoppers 110-1, 110-2 and the dispensing valve 132 and the lower pressurization valve 142-1 are open to supply pressurized air to the lower container or hopper 110-1. In step 202, the feed device 130 operates to dispense material to the convey line 106 from the lower hopper 110-1. When the material supply in the lower hopper 110-1 is low as measured by load cell 170-1, the lower fill valve 120-1 and vent valve 124-1 are opened in step 204 to refill the lower hopper 110-1 through the upper hopper 110-2. While the lower hopper 110-1 is refilled, the feed device 130 continues to operate to dispense material as illustrated in step 206.

The upper hopper 110-2 alternates between a filling phase and a dispensing phase to fill the lower hopper 110-1 during the refill time period t. During the filling phase, the upper fill valve 120-2 and vent valve 124-2 are opened as illustrated in step 210 to fill the upper hopper 110-2 with material from bin 108 in step 212. In step 214, the upper fill valve 120-2 and vent valve 124-2 are closed and the lower fill valve 120-1 and vent valve 124-1 between the upper and lower hoppers 110-1, 110-2 are opened in step 204 to refill the lower hopper 110-1 with material from the upper hopper 110-2 as illustrated in step 216. The process steps are repeated to refill the upper and lower hoppers 110-1, 110-2 to implement the fill cycle as illustrated in Table IV.

Figure 6B:
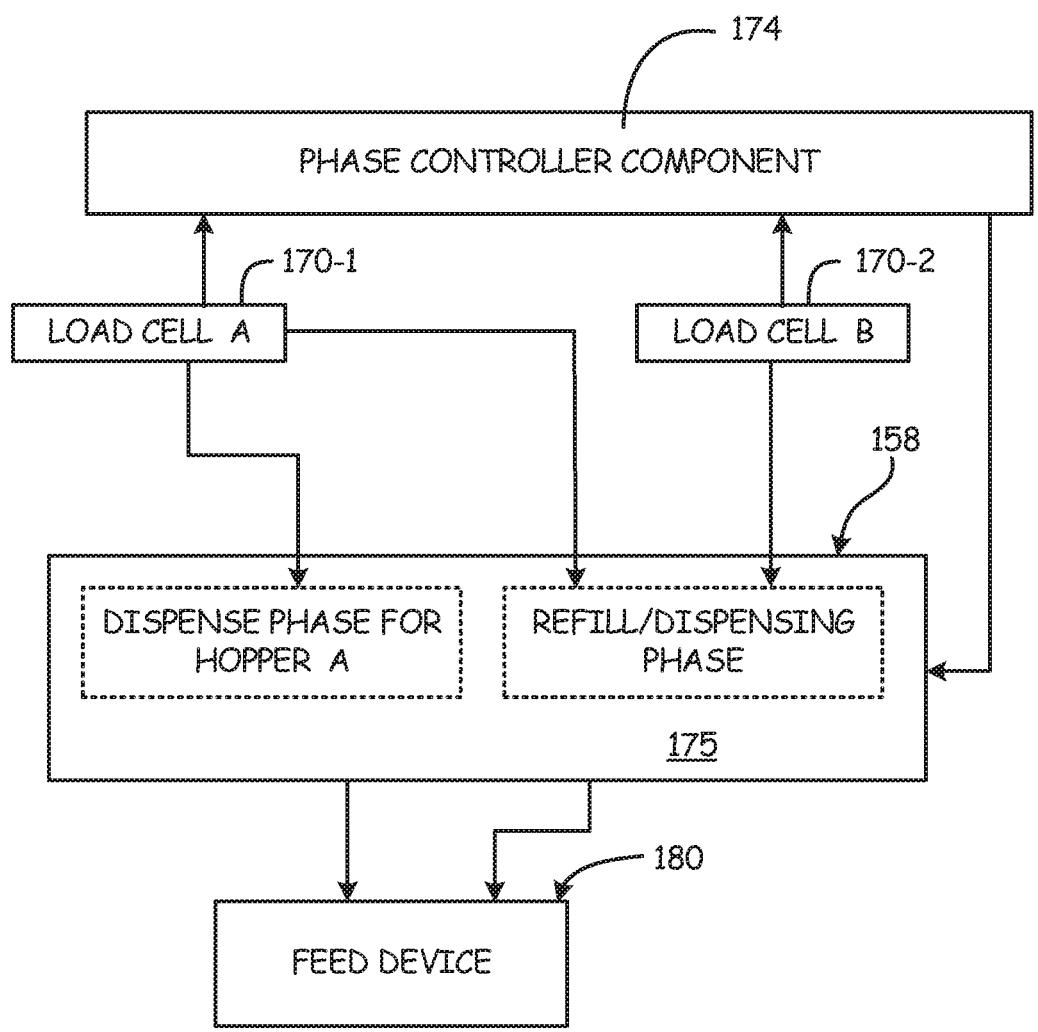
FIG. 6B illustrates controller operations for controlling a feed device for multiple stacked hoppers utilizing input from multiple load cells for continuous loss of weight feed control.

FIG. 6B illustrates a control assembly for providing loss of weight or mass flow rate control during the dispensing/refill period when the lower hopper 110-1 is refilled from the upper hopper 110-2 as described. As shown, the controller 175 uses input from load cell 170-1 to control output flow rate of material from the lower hopper 110-1 to the convey line 106 while the hopper 110-1 is above a threshold fill level. The phase controller 174 monitors the output from load cell 170-1 to determine if the weight of material in the lower hopper 110-1 is below the threshold level. If the weight is below the threshold level, the phase controller 174 opens the fill valve 120-1 and vent valves 124-1 between the upper and lower hoppers 110-1, 110-2 and the controller 175 uses the input from both load cells 170-1, 170-2 to control the feed rate of the feed device 130 while the upper hopper 110-2. refills the lower hopper 110-1. Following the refill process, the phase controller 174 closes the fill valve 120-1 and vent valves 124-1 and the mass flow controller 175 controls the material flow rate via input only from load cell 170-1. The controller unit 158 as described provides a means for controlling the adjustable feed rate utilizing input from both the first and second load cells during one time period and from one of the first and second load cells during another time period.

Figure 6C:
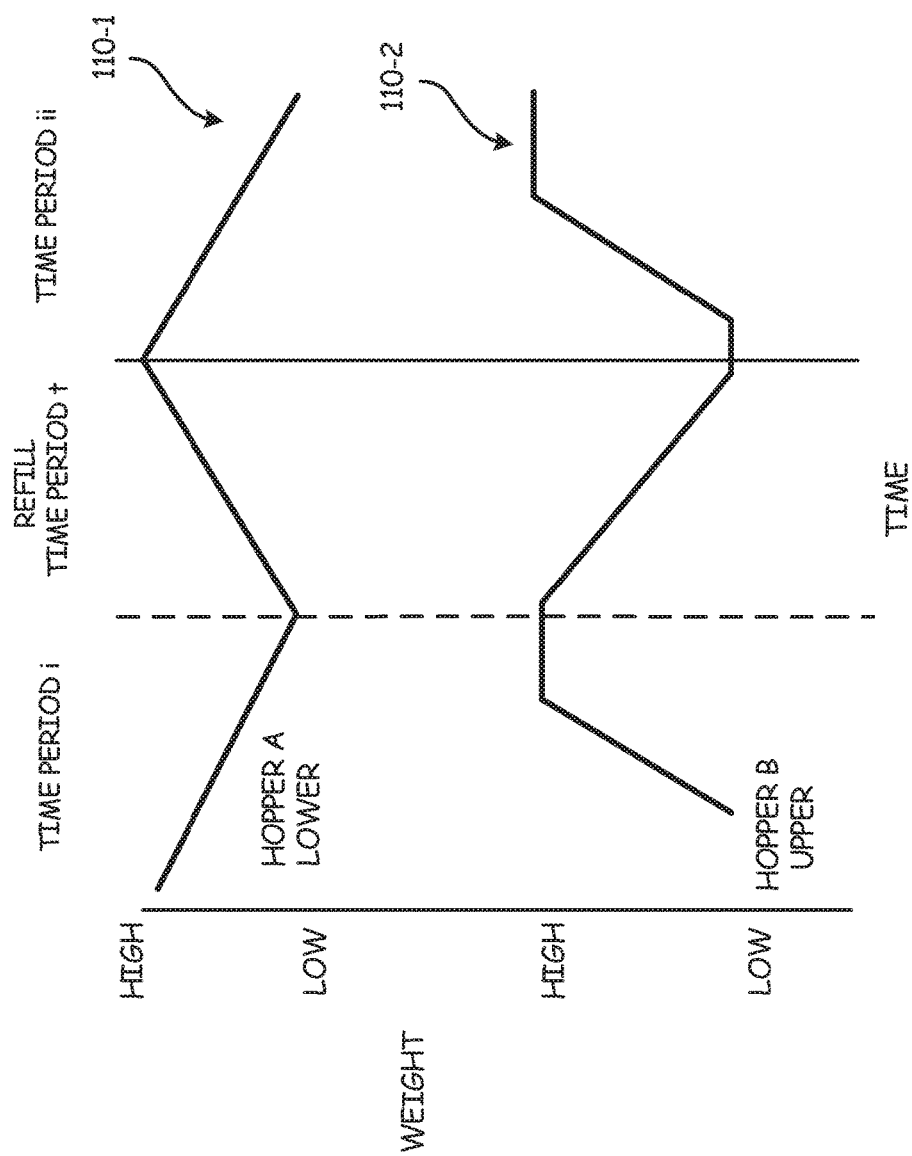
FIG. 6C illustrates a weight of the stacked hoppers during different time periods.

FIG. 6C graphically illustrates a weight of upper and lower hoppers 110-1 and 110-2 during the time period i and refilling time period t during which the lower hopper 110-1 is refilled with material from the upper hopper 110-2. As shown, during the time period i, as material is dispensed from the lower hopper 110-1 the weight of the material decreases as measured by the load cell 170-1. During the time period i, the weight of the upper hopper 110-2 increases as the hopper is filled from bin 108. As previously described, when the weight of the material in the lower hopper 110-1 goes below the threshold level, the phase controller 174 switches to a refill control scheme to refill the lower hopper 110-1 from the upper hopper 110-2. As the lower hopper 110-1 is refilled, the weight increases and the weight of the upper hopper 110-2 decreases. During the refill time period t, the mass flow rate controller 175 uses input weight from both load cells 170-1, 170-2 to control the feed device 130 to dispense the set amount of material to the convey line 106 using a mass or loss in weight control algorithm as described. In particular, the controller 175 uses the combined weight input from both load cells 170-1, 170-2 to determine the mass flow rate via the mass flow determiner 186. As previously described, the system alternates between time period i and the refill time periods t while the feed device 130 continuously operates to dispense material.

Figure 6D:
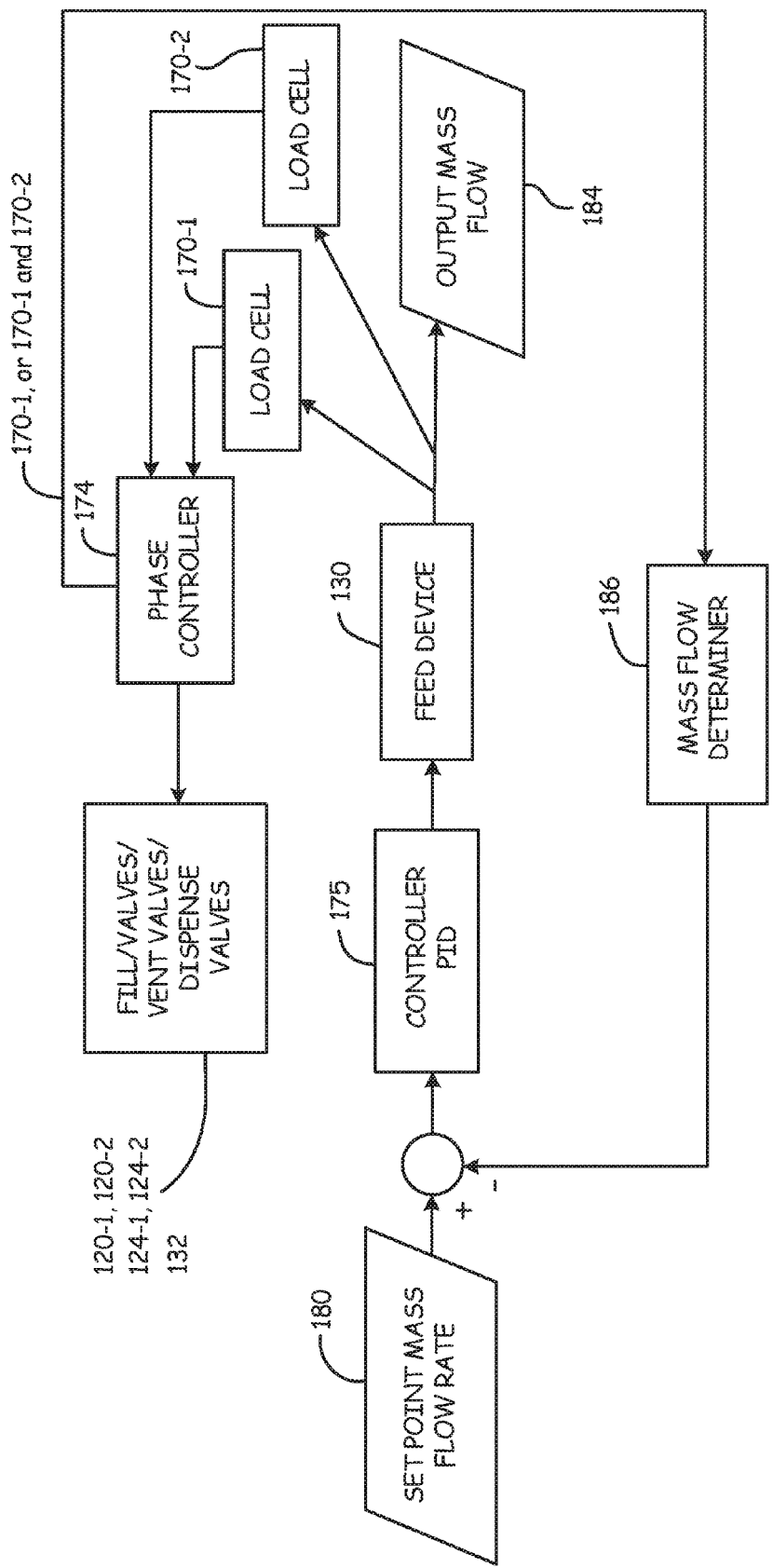
FIG. 6D illustrates an embodiment of a control scheme utilizing input from load cells for multiple hoppers to provide continuous loss of weight feed control for continuous injection of material from multiple hoppers.

FIG. 6D illustrates an embodiment of the control scheme and feedback loop for feed device 130 utilizing feedback from load cells 170-1, 170-2 coupled to the multiple hoppers 110-1, 110-2. As previously described the control loop receives a set control mass flow rate 180 which the controller 175 uses to increase or decrease the speed or feed rate of the feed device 130 to provide the set mass flow from hoppers 110-1, 110-2 (not shown in FIG. 6D) to the convey line 106. As shown, feedback from load cells 170-1, 170-2 coupled to the hoppers 110-1, 110-2 (not shown) is used by the mass flow determiner 186 to determine loss of weight mass flow rate which is compared to the set control mass flow rate 180 to determine the feedback error. The feedback error is used by the controller 175 to increase or decrease the feed rate or speed of the feed device 130. Depending upon the operating phase, the mass flow rate is determined based upon input from one or both loads cells 170-1 or 170-1 and 170-2. The mass flow determiner 186 uses input from the phase controller 174 or filter logic to eliminate input from load cell 170-2 in the mass flow calculation while hopper 110-2 is filled. As previously described, output from the load cells 170-1 is provided to the phase controller 174 to switch operation between different operating phases as generally described in FIGS. 6A-6C. Thus as described, the assembly provides continuous loss of weight feed control eliminating the need for volumetric feed control schemes while the hopper 110-1 is refilled.

Embodiments of the delivery systems described herein have application for fluidizing powders such as powder activated carbon having a particle size of less than 20 microns. Embodiments of the delivery or pneumatic conveying system described herein have application for conveying dilute phase sorbent material for both industrial and utility boilers as well as other applications. Although the present invention has been described with reference to preferred embodiments, workers skilled in the art will recognize that changes may be made in form and detail without departing from the spirit and scope of the invention. For example, application is not limited to two hoppers connected in parallel or in series and dispense operations can be coordinated for any number of hoppers connected to the convey line using the loss of weight control scheme described.

What is claimed is:

1. An assembly comprising
    a controller device coupled to a first load cell to provide an input load measurement for a first hopper and a second load cell to provide an input load measurement for a second hopper; and
    at least one rotary airlock feed device including an outlet coupled to a convey line to dispense material from at least one of the first and second hoppers into the convey line and the controller device utilizes the input load measurements from both the first and second load cells to generate an output control signal to increase or decrease a feed rate of the at least one rotary airlock feed device responsive to the input load measurements from both the first and second load cells.

2. The assembly of claim 1 wherein the controller device utilizes the input load measurement from the first load cell and not the input load measurement from the second load cell during a first time period to generate the control signal to increase or decrease the feed rate of the at least one rotary airlock feed device responsive to the input load measurement from the first load cell and not the input load measurement from the second load cell and utilizes the input load measurements from both the first and second load cells during a second time period to generate the control signal to increase or decrease the feed rate of the at least one rotary airlock teed device responsive to the input load measurements from both the first and second load cells.

3. The assembly of claim 2 wherein the at least one rotary airlock feed device includes a first rotary airlock feed device to dispense material from the first hopper at a first feed rate and a second rotary airlock feed device to dispense material from the second hopper at a second feed rate and the controller device uses the input load measurements from the first and second load cells and a ramp down function to generate a first control signal for the first airlock feed device to decrease the first feed rate of the first airlock feed device during the second time period and a ramp up function and the input load measurements from the first and second load cells to generate a second control signal for the second rotary airlock feed device to increase the second feed rate of the second airlock teed device during the second time period.

4. The assembly of claim 3 wherein the second rotary airlock feed device is idle during the first time period and the controller device utilizes the input load measurement from the second load cell and not the input load measurement from the first load cell to generate the second control signal for the second rotary airlock feed device during a third time period and the first rotary airlock feed device is idle during the third time period.

5. An assembly comprising
    a controller device coupled to a first load cell to provide an input load measurement for a first hopper and a second load cell to provide an input load measurement for a second hopper and the controller device utilizes the input load measurement from the first load cell and not the input load measurement from the second load cell to generate a control signal to increase or decrease a feed rate of a variable rate feed device during a first time period responsive to the input load measurement from the first load cell and utilizes the input load measurements from both the first and second load cells to generate the control signal to increase or decrease the feed rate of the variable rate feed device during a second time period different from the first time period responsive to the input load measurements from both the first and second load cells.

6. The assembly of claim 5 wherein the feed device includes a first feed device coupled to the first hopper and a second feed device coupled to the second hopper and the controller device utilizes the input load measurements from both the first and second load cells during the second time period to generate a control signal for the first feed device to increase or decrease a feed rate of the first feed device and a control signal for the second feed device to increase or decrease a feed rate of the second feed device during the second time period responsive to the input load measurements from both the first and second load cells.

7. The assembly of claim 5 wherein the controller device utilizes a set point mass flow rate and uses the input load measurements from both the first and second load cells to generate the control signal to increase or decrease the feed rate of the feed device to match the set point mass flow rate during the second time period.

8. The assembly of claim 5 wherein the controller device compares the input load measurement from the first load cell to a threshold load during the first time period and if the input load measurement from the first load cell is below the threshold load, the controller device uses the input load measurements from both the first and second load cells to increase or decrease the feed rate of the feed device responsive to the input load measurements from both the first and second load cells during the second time period.

9. The assembly of claim 5 wherein the assembly includes the first hopper and the second hopper and the first hopper is coupled to a convey line via the feed device and the second hopper is coupled to the convey line through the first hopper and the controller device utilizes the input load measurement from the first load cell and not the input load measurement from the second load cell to generate the control signal to increase or decrease the feed rate of the feed device during the first time period and the input load measurements from both the first and second load cells to generate the control signal to increase or decrease the feed rate of the feed device during the second time period.

10. The assembly of claim 9 wherein the controller device provides a control signal to close a fill valve to the first hopper and open a fill valve to the second hopper during the first time period and open the fill valve to the first hopper and close the fill valve to the second hopper during the third time period.

11. The assembly of claim 6 wherein the controller device utilizes a ramp down function for the first feed device to decrease the feed rate of material dispensed from the first hopper during the second time period and a ramp up function for the second feed device to increase the teed rate of material dispensed from the second hopper during the second time period.

12. The assembly of claim 5 wherein the controller device compares the input load measurement from the first load cell to a threshold level and shifts operations from the first time period to the second time period if the input load measurement from the first load cell is below the threshold level to control the feed rate of the feed device responsive to the input load measurements from both the first and second load cells during the second time period.

13. The assembly of claim 5 wherein the assembly includes the first hopper and the second hopper and the first hopper is coupled to a convey line via the feed device and the second hopper is coupled to the convey line through the first hopper and the controller device utilizes the input load measurement from the first load cell and not the second load cell to generate the control signal to increase or decrease the feed rate of the feed device during the first time period and the input load measurements from both the first and second load cells to generate the control signal to increase or decrease the feed rate of the feed device during the second time period.

14. The assembly of claim 13 wherein a fill valve to the second hopper is opened during the first time period and closed during the second time period and a valve between the first and second hoppers is opened during the second time period to provide material flow from the second hopper into the first hopper.

15. An assembly comprising
a controller device coupled to a first load cell to provide an input load measurement for a first hopper and a second load cell to provide an input load measurement for a second hopper;
a first variable rate feed device coupled to the first hopper and a second variable rate feed device coupled to the second hopper wherein the controller device generates a first output control signal using the input load measurements from both the first and second load cells to increase or decrease a feed rate of the first variable rate feed device coupled to the controller and a second control signal responsive to the input load measurements from both the first and second load cells to increase or decrease a feed rate of the second feed device.

16. The assembly of claim 15 wherein the controller device utilizes the input load measurement from the first load cell and not the input load measurement from the second load cell during a first time period to generate the first control signal to increase or decrease the feed rate of the first feed device responsive to the input load measurement from the first load cell and the input load measurements from both the first and second load cells to generate the first and second control signals to increase or decrease the feed rate of the first and second feed devices during a second time period.

17. The assembly of claim 16 wherein during the second time period the feed rate of the first feed device is reduced and the feed rate of the second feed device is increased.

18. The assembly of claim 17 wherein the second feed device is idle during the first time period and the first feed device is idle during a third time period and the controller device utilizes the input load measurement from the second load cell and not the input load measurement from the first load cell to generate the second control signal to increase or decrease the feed rate of the second feed device during the third time period.

19. The assembly of claim 15 wherein the controller device utilizes a set point flow rate and uses the input load measurements from both the first and second load cells to output the first and second control signals to increase or decrease the feed rates of the first and second feed devices to match the set point flow rate.

20. The assembly of claim 16 wherein the controller device uses a ramp down function for the first feed device to decrease the feed rate of material dispensed from the first hopper during the second time period and a ramp up function for the second feed device to increase the feed rate of material dispensed from the second hopper during the second time period.

* * * * *